United States Patent Office 3,530,454
Patented Sept. 22, 1970

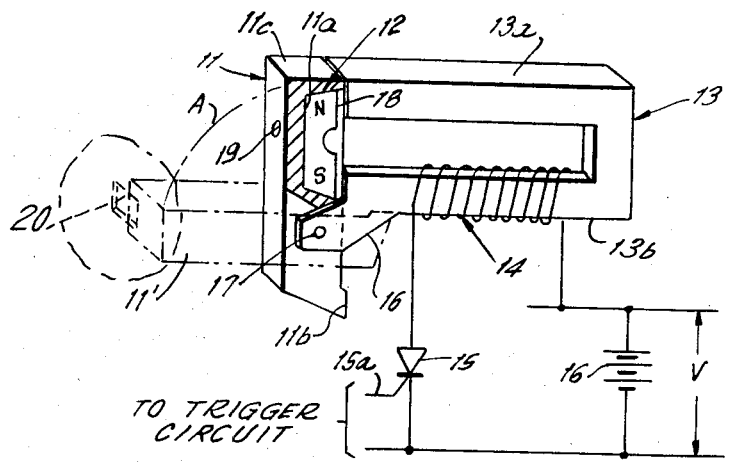

3,530,454
DROP ANNUNCIATOR WITH PIVOTALLY-MOUNTED TARGET INDICATOR BEARING A PERMANENT MAGNET
Stanley E. Zocholl, Holland, Pa., assignor, by mesne assignments, to I-T-E Imperial Corporation, Philadelphia, Pa., a corporation of Delaware
Filed Oct. 9, 1967, Ser. No. 673,716
Int. Cl. G08b 21/00
U.S. Cl. 340—253           9 Claims

ABSTRACT OF THE DISCLOSURE

A drop annunciator containing a stationary magnetic yoke which surrounds a pivotally-mounted non-magnetic armature. The non-magnetic armature has a permanent magnet fixed thereto which is movable from an upright position in which it is magnetically sealed to the yoke to a horizontal position in which it is retained by gravity. A winding on the yoke is energized through a controlled rectifier to create a magnetic field in the yoke which repels the permanent magnet in the rotatable member. When the rotatable member drops, its top can be observed through a window in the housing containing the drop annunciator.

---

The instant invention relates to circuit interrupters and the like and more particularly to a novel permanent magnet target device for use with overcurrent relay devices of the solid state type wherein a positive indication is provided of the tripping of circuit interrupter under control of a static overcurrent relay.

Conventional overcurrent relays are incorporated with circuit interrupter devices employed in power distribution networks for the purpose of protecting the network from being damaged due to the flow of currents whose magnitudes reach undesirable or dangerous levels as a result of short circuits or other faults in the network.

Typically an overcurrent relay is an electromechanical device which operates over a time duration inversely proportional to the magnitude of the current in the power network being monitored. For example, if current flow is slightly above normal levels the overcurrent relay will take a long time before tripping a circuit interrupter in the presence of such a current. If the current being monitored abruptly changes to a rather large magnitude, say a number of times greater than normal current magnitude, the tripping operation will occur after a rather brief time interval has elapsed.

The electromechanical relays which are employed usually to close a contact or initiating the tripping of a circuit interrupter further has its mechanical movement coupled to a mechanical indicator, commonly referred to as a "flag" or "target" which is caused to "drop" from a normal position and which normally cooperates with a window through which the "dropped" position may be observed to positively identify the fact that a tripping operation has occurred due to a fault current condition. The indication normally remains even though control power may not be available until observation and acknowledgment of its "dropped" state occurs and the device is then manually reset.

Much progress has been made in the circuit interrupter field and especially in the overcurrent relay field wherein static techniques are now being employed in a widespread manner in the development and construction of overcurrent and other types of relays. Such relays normally employ solid state devices such as transistors, silicon controlled rectifiers and the like in conjunction with passive electronic elements such as resistors, capacitors, inductors and the like in order to perform the same functions conventionally performed by electromechanical relays, i.e. in order to provide inverse time delay operation relative to fault current conditions being monitored. Typical examples of such recent developments are set forth in U.S. Pats. 3,339,114 and No. 3,334,272, for example, issued Aug. 29, 1967 and Aug. 1, 1967 and assigned to the assignee of the instant invention.

The advent of the static overcurrent relay presents the problem of providing a suitable "flag" or "target" which will operate to indicate the currents of a tripping operation and which may be employed in conjunction with such static overcurrent relays. In the past, the target devices were able to utilize the physical movement of electromechanical relays employed as the overcurrent relay devices for causing their operation. With static overcurrent relays since all components are of the solid state type no mechanical motion is present so that no suitable "flag" or "target" means is available for use in conjunction with static overcurrent relays.

The instant invention is characterized by providing a novel "flag" apparatus including means for being electronically triggered by the static overcurrent relay and means for converting this signal into the mechanical movement required to provide a "target" indication.

The instant invention is comprised of a series loop circuit including a normally open semiconductor device having a gate and which is connected in series with a coil and a suitable power source. The coil is inductively coupled to a yoke member formed of a suitable ferrous material so as to magnetize the ferrous yoke in the presence of a current flow through the loop circuit. A non-magnetic movable indicator is pivotally mounted to one portion of the yoke and has imbedded therein a permanent magnet member generating a magnetic field of sufficient strength to hold the non-magnetic indicator against the yoke.

Upon application of a trigger pulse to the normally open semiconductor device the circuit loop is closed causing a current to flow through the winding so as to magnetize the yoke and set up a motor action with the permanent magnet member urging it away from the face of the yoke. This causes the indicating member to "drop" so that a face thereof cooperates, for example, with a "window" to provide a positive indication of the fact that a tripping operation has occurred. The indicating member remains in the "dropped" position until its "dropped" position is observed, acknowledged and manually reset. The current capacity of the static circuit for the target is quite low and sensitivity of the device may be adjusted by the provision of an adjustable air gap between the yoke and permanent magnet members thereby imposing an extremely light duty upon the static relay device.

It is therefore one object of the instant invention to provide a novel "target" device for use with static overcurrent relays.

Another object of the instant invention is to provide a novel "target" device for use with circuit interrupters and the like wherein the target device may be triggered by static overcurrent relay means to "drop" the "target" indicating member to provide a visually observable indication that a tripping operation has occurred.

Still another object of the instant invention is to provide a novel "target" device for use in circuit interrupters and the like which means is comprised of a normally open circuit loop comprising a power source, a normally non-conducting semiconductor device and a coil, said coil being employed to magnetize a yoke member for urging an indicating member from a first position to a "dropped" position by means of a trigger pulse applied by a static overcurrent relay device to indicate the performance of a circuit interrupter tripping operation.

Still another object of the instant invention is to provide a novel "target" device for use in circuit interrupters and the like which means is comprised of a normally open circuit loop comprising a power source, a normally non-conducting semiconductor device and a coil, said coil being employed to magnetize a yoke member for urging an indicating member from a first position to a "dropped" position by means of a trigger pulse applied by a static overcurrent relay device to indicate the performance of a circuit interrupter tripping operation wherein the pivotally mounted indicating member is designed to cooperate with a "window" to provide a visually observable indication and wherein the indicating member remains in the "dropped" position until it is manually reset.

These and other objects of the instant invention will become apparent when reading the accompanying description and drawings in which:

The sole figure is a schematic diagram showing a target device designed in accordance with the principles of the instant invention.

The sole figure of this application shows a target device 10 comprised of a non-magnetic member 11 which is pivotally mounted to a substantially U-shaped yoke member 13 formed, preferably, of a ferrous material. The yoke member is provided with a pair of brackets 16. A permanent magnet member 12 is embedded in non-magnetic indicating member 11 in the manner shown in the figure. A portion of the indicating member 11 has been broken away to indicate the manner in which the permanent magnet 12 is positioned and secured within a cavity 11a. The permanent magnet may be secured by suitable adhesive means, for example. As shown in the figure, an air gap 18 exists between the adjacent faces of yoke 13 and permanent magnet 12 which may be employed to control the sensitivity of the device, in a manner to be more fully described. In an effort to provide means for adjusting the air gap the threaded fastening member 19 may be provided which threadedly engages a suitable opening in indicating member 11 so as to bear against the left-hand surface of permanent magnet 12 driving it either closer, toward or further away from the opposing surfaces of yoke member 13. Obviously, any other adjustable means may be provided, depending only upon the particular application involved.

Yoke 13 is inductively coupled to a coil 14 which is wound about one arm of the yoke and which forms one circuit component of a loop circuit comprised of coil 14, silicon controlled rectifier 15 and power source 16. Silicon controlled rectifier 15 is normally in the non-conductive state and has its anode and cathode respectively coupled to coil 14 and power source 16. Its gate electrode 15a is coupled to the trigger circuit of a static overcurrent relay device such as the devices described in the aforementioned U.S. Pats. No. 3,339,114 and No. 3,334,272.

The operation of the target device is as follows:

The target device is normally set with the non-magnetic indicating member 11 in its solid line position. In this position, permanent magnet 12 sets up a magnetic field with strength sufficient to cause it to be attracted to the opposing surfaces of yoke 13 which position will be maintained indefinitely.

In the case where a tripping operation is to occur after the elapse of a predetermined inverse time delay the static relay circuit will develop a trigger pulse to initiate the tripping operation at the completion of the above-mentioned time interval. This trigger pulse is applied to gate 15a causing silicon controlled rectifier 15 to conduct. This closes the loop circuit causing current to pass through coil 14 which, in turn, magnetizes yoke 13. The magnetic field set up in the region between the end faces of yoke arms 13a and 13b repels the magnetic field set up by permanent magnet member 12 causing the indicating member 11 to be urged counterclockwise about pivot pin 17. The field strength of the magnetic field generated in yoke 13 may be quite small since it need only be of a strength sufficient to move indicating member 11 slightly off-vertical whereby the indicating member will be dropped by gravity to the dotted line position 11'. The bottom end of indicating member 11 is provided with a projection 11b which abuts one surface of yoke arm 13b to limit any further rotational movement thereof. When in the dropped position the upper surface 11c of indicating member 11 which may be painted a suitable color such as red or may have indicia printed thereon such as the word "trip," will come into alignment with a window 20 which may, for example, be provided in the housing which covers the circuit interrupter so as to provide a visually observable indication of the fact that a tripping operation has occurred. The weight of the non-magnetic indicating member causes it to be retained in the dotted line position once moved to that position so that only an acknowledgment of a tripping operation and a manual reset of the target device can cause it to return to the solid line position 11.

As was previously mentioned, the sensitivity of the target device may be adjusted by adjusting the gap between the surfaces of yoke arms 13a and 13b and the opposing surfaces of permanent magnet member 18. The permanent magnet member operates as a "hold-in" means, totally eliminating the need for a mechanical latching mechanism and the wear and adjustment normally associated with such mechanisms.

The polarity of current flow in the circuit loop is such that the resulting magnetic field set up in yoke 13 will oppose the field of the magnet. Only a small number of ampere turns are required to release the permanent magnet which, in the absence of current flowing through coil 14 provides a more than sufficient holding force for most applications.

It can clearly be seen from the foregoing that the instant invention provides a novel target indicating device for use with circuit interrupters employing static overcurrent relays wherein the pivotally mounted indicating member is provided with permanent magnet "hold-in" means eliminating any need whatsoever for mechanical latching mechanisms and which is caused to "drop" through the use of a normally open circuit loop which is triggered by a semiconductor device provided in the circuit loop to energize a coil which magnetizes the yoke for driving the indicating member by motor action to the dropped position for indicating the occurrence of a circuit interrupter tripping operation. The "dropped" position will be maintained indefinitely until observance, acknowledgment and manual reset is performed.

What is claimed is:

1. Means for indicating the tripping of a circuit interrupter operative under control of static relay means which initiates the tripping operation by generating a trigger pulse, comprising a loop circuit comprised of a series connected semiconductor means, a coil and a power source;

said semiconductor means being normally non-conducting;

yoke means inductively coupled to said coil;

a pivotally mounted indicating member;

hold-in means secured to said indicating member magnetically attracted to said yoke means for normally maintaining said indicating member in a substantially upright position;

said semiconductor means having a gate for receiving said trigger pulse to close said loop circuit and thereby energize said coil;

said energized coil causing said yoke means to become magnetized to repel the hold-in means and drive said indicating member to a substantially horizontal position; said indicating means being retained in said horizontal position by gravity, and being manually rotatable to said upright position.

2. The indicating means of claim 1 further comprising a housing covering at least said indicating member; said housing having a window for observing said indicating member which moves into view upon energization of said semiconductor means.

3. The indicating means of claim 2 wherein said indicating member is pivotally mounted at one end thereof;
the opposite end of said indicating member having indicia thereon to facilitate observation thereof through said window when in the substantially horizontal position.

4. The indicating means of claim 3 wherein said hold-in means is a permanent magnet;
said indicating member having a cavity for receiving and supporting said permanent magnet;
said indicating member maintaining said permanent magnet a spaced distance from said yoke member to provide an air gap therebetween.

5. The indicating means of claim 4 wherein said indicating means is further provided with means for manually adjusting said air gap.

6. The indicating means of claim 4 wherein said yoke is a ferrous member and said indicating member is nonmagnetic.

7. The indicating means of claim 1 wherein said semiconductor means is a silicon controlled rectifier having anode and cathode electrodes connected in said loop circuit and a gate electrode for receiving said trigger pulse.

8. The indicating means of claim 1 wherein said yoke means is provided with bracket means at one end thereof for pivotally mounting said indicating member.

9. The indicating means of claim 8 wherein said yoke means is a substantially U-shaped ferrous member;
said bracket means being positioned at the free end of one arm of said yoke means;
said hold-in means being a permanent magnet positioned adjacent to the ends of the arms of said yoke means when said indicating member is in the upright position.

References Cited

UNITED STATES PATENTS

| | | | |
|---|---|---|---|
| 1,176,421 | 3/1916 | Beach | 335—234 |
| 3,025,512 | 3/1962 | Bloechl | 340—373 |
| 3,140,431 | 7/1964 | Schalkwijk | 340—373 XR |
| 3,218,523 | 11/1965 | Benson | 335—234 |
| 3,286,131 | 11/1966 | Myers | 317—33 |

ALVIN H. WARING, Primary Examiner

D. MYER, Assistant Examiner

U.S. Cl. X.R.
335—234; 340—373